Aug. 26, 1930.  E. H. REMDE  1,773,860
INDUSTRIAL TRUCK
Filed May 31, 1928  3 Sheets-Sheet 3
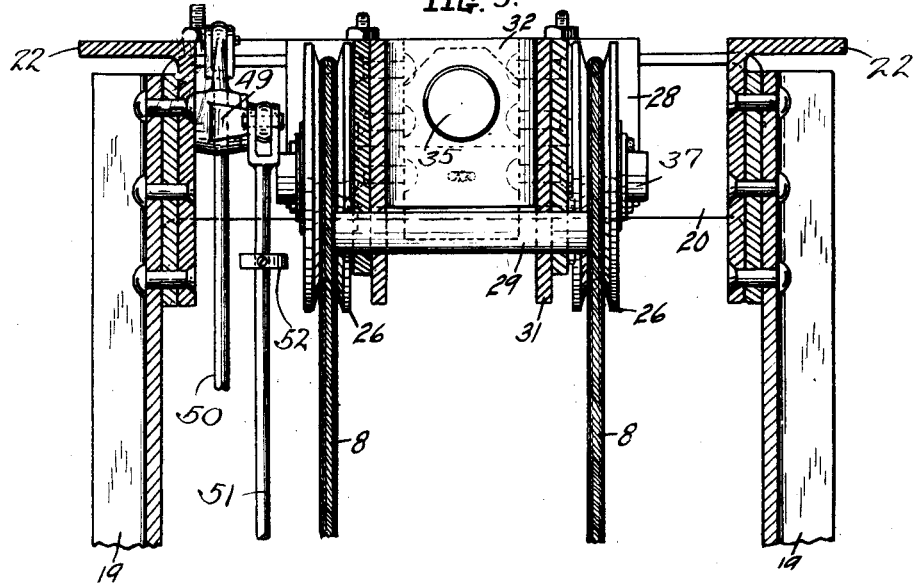
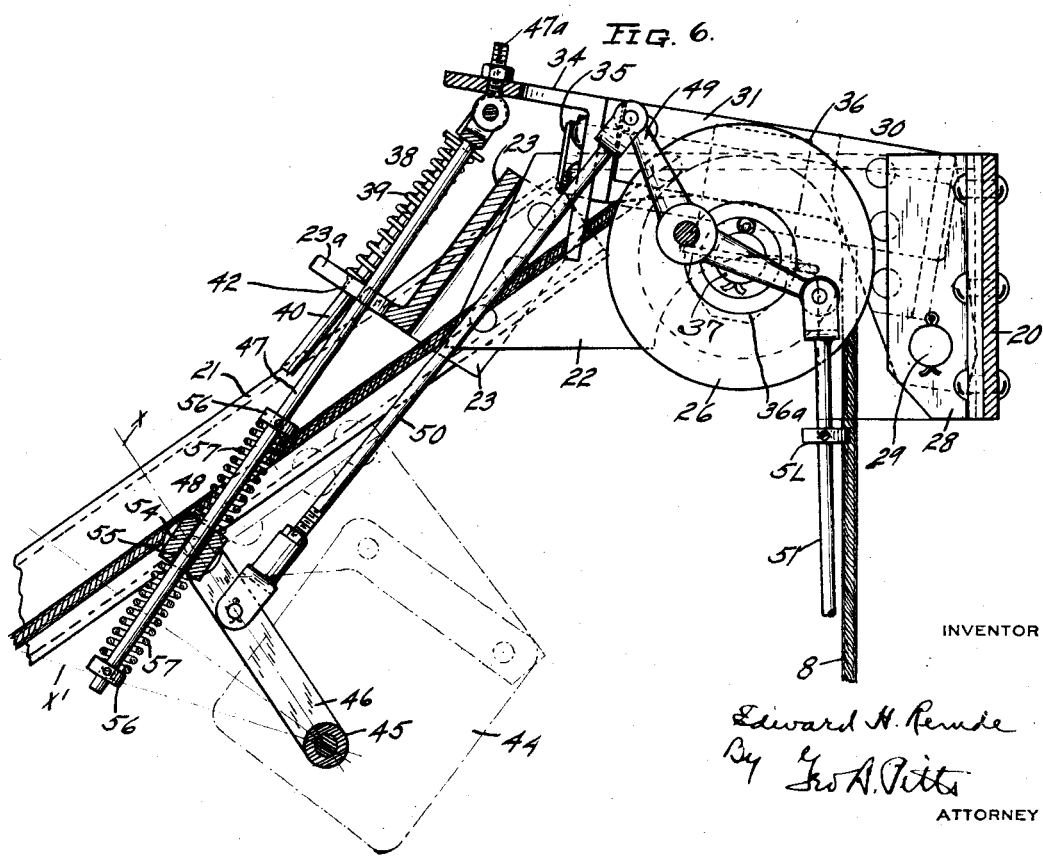
INVENTOR
Edward H. Remde
By Geo. A. Pitts
ATTORNEY Patented Aug. 26, 1930

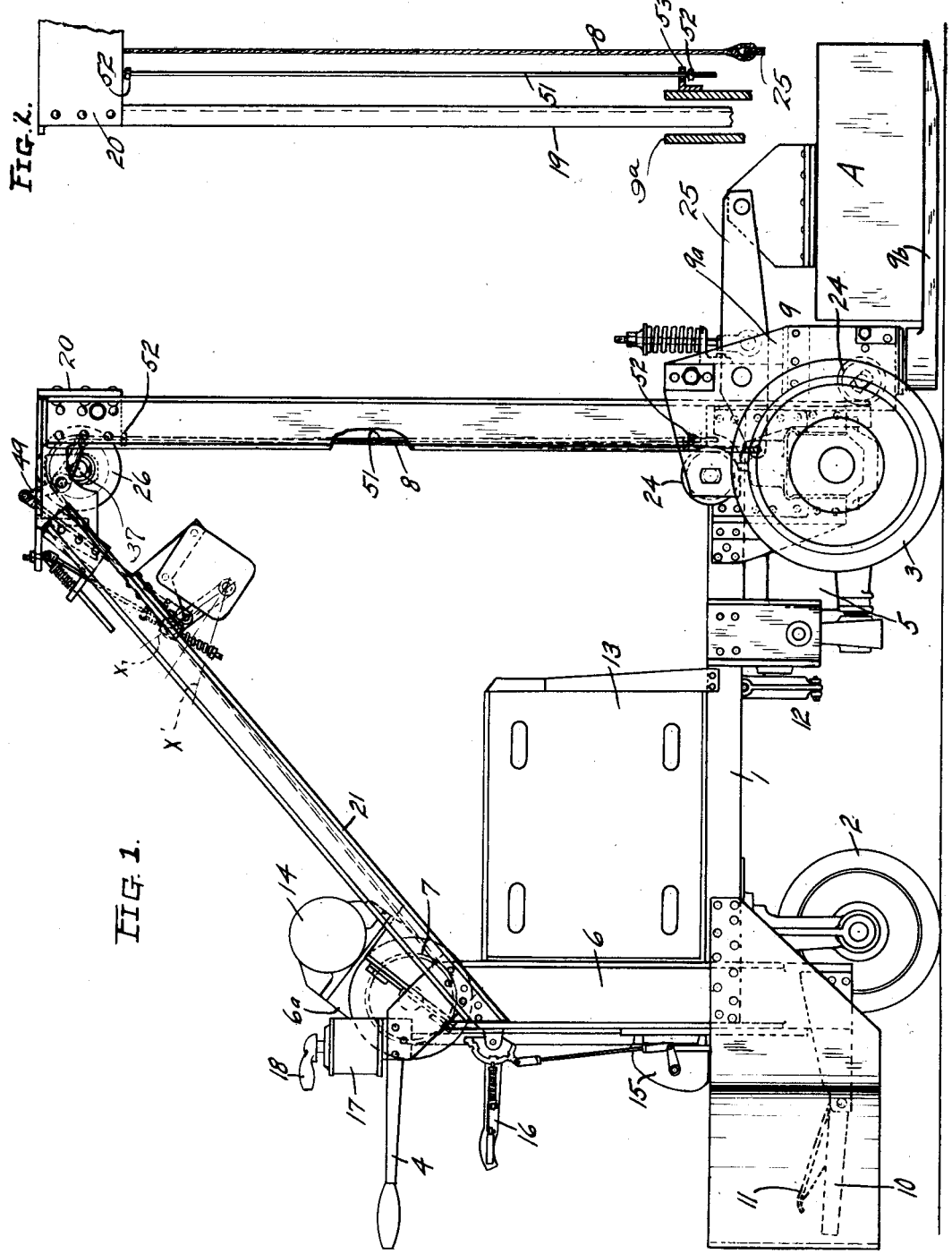

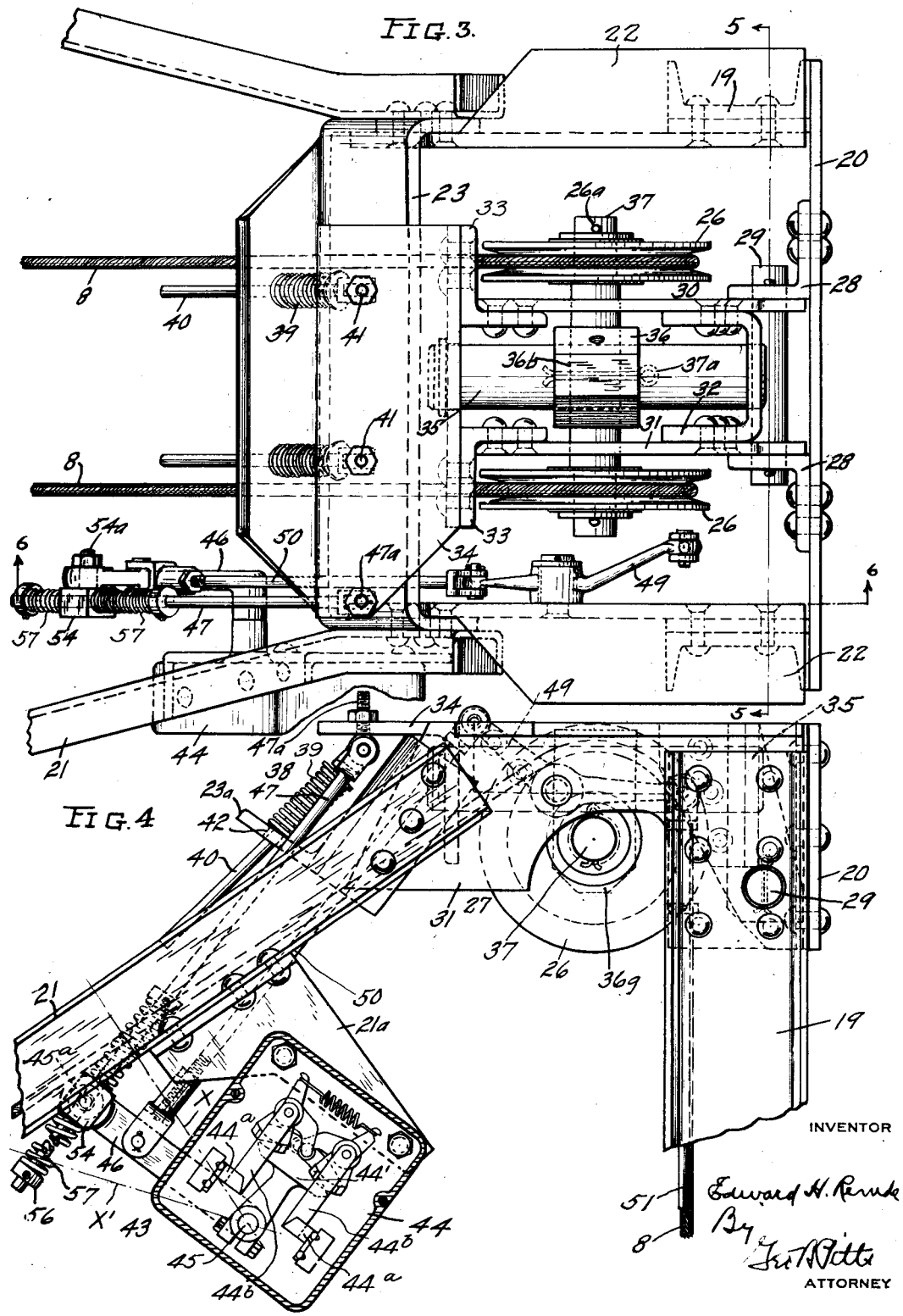

1,773,860

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed May 31, 1928. Serial No. 281,704.

This invention relates to an industrial truck in which provision is made for lifting and handling loads.

One object of the invention is to provide in a truck of this character improved means for taking up slack in the hoisting element or elements.

Another object of the invention is to provide in a truck of this character improved means for stopping the hoisting mechanism when undue slack occurs in the hoisting element or elements thereof.

A further object of the invention is to provide in a truck of this character having a flexible hoisting element, an improved mounting for the reeving member therefor whereby the latter automatically takes up any slack occurring in such element at any time.

Another object of the invention is to provide in a truck of this character having a flexible hoisting element running over and depending from a reeving member, an improved mounting for movably supporting such member and means for operating the mounting to move the reeving member in an upward direction when slack occurs in said element.

Other objects of the invention will be apparent to those skilled in the art to which my invention relates from the following description taken in connection with the accompanying drawings, wherein Fig. 1 is a side view of a truck embodying my invention.

Fig. 2 is a fragmentary view of parts shown in Fig. 1 looking toward the left.

Fig. 3 is a fragmentary plan view of parts shown in Fig. 1.

Fig. 4 is a side view of parts shown in Fig. 3.

Figs. 5 and 6 are sections on the lines 5—5 and 6—6, respectively, of Fig. 3.

In the drawings, 1 indicates a suitable frame mounted on wheels 2, 3; by preference the former being steerable by means of a lever 4 and the latter being driven by a motor 5. 6 indicates a pair of uprights secured to the frame 1 and supporting a casing 6ª which encloses a drive mechanism for one or more drums 7 on which winds and unwinds flexible hoisting elements—such as wire cables—8, whereby a load handling device 9 (shown herein as an elevating or lifting and carrying member) is raised and lowered. Where two cables 8 are employed, I may provide two drums 7, preferably disposed at opposite sides of their driving mechanism. 10 indicates a platform for an operative mounted on brackets secured to the lower ends of the uprights 6. 11 indicates a foot pedal associated with the platform 10 and connected through suitable linkage (not shown) with a brake mechanism 12 which operates to engage or release a wheel driven by the motor 5.

Suitable electric storage batteries are mounted on the frame 1, preferably adjacent the driving end of the truck, the weight of the batteries serving to counterbalance the load on the device 9. The batteries may be enclosed by a casing 13 and supply current to the motor 5 and a motor 14 which operates through a suitable driving mechanism, within the casing 6ª, to drive the drums 7. 15 indicates a suitable controller for the motor 5, the controller being operated by a lever 16. 17 indicates a controller for the motor 14, operated by a handle 18.

19 indicates a guide frame preferably rigidly connected at its lower end to the frame 1 and serving to guide the device 9 when raised and lowered by the hoisting elements 8. The guide frame preferably comprises a pair of channels, connected at their upper ends by a tie member 20. Where the guide channels are fixed to the frame 1, their upper ends are braced by suitable members—such as channels—21, connected at their lower ends to the uprights 6. At their upper ends, each brace member 21 is connected to the inner end of a bracket 22, the outer end or portion of which is connected to the adjacent guide channel 19. 23 indicates a cross member having inturned ends connected to the brackets 22 and serving to brace them at their inner ends. Each inturned end of the cross member is disposed between the adjacent brace member 21 and bracket 22 so that the same means (such as rivets) may be employed for securing all of the parts together. A further purpose of the cross-member 23 will later appear.

The load lifting member 9 comprises a main portion 9ª having pairs of rollers 24 which engage the front and rear sides of the guide channels 19 and an outwardly projecting portion 9ᵇ, such as forks, adapted to be projected below the load A. The hoisting elements 8 are operatively connected with the load lifting member 9, such elements in the present illustrated form of construction being connected at their outer ends to arms 25 trunnioned on the portion 9ª and forming part of a mechanism for clamping the load on the portion 9ᵇ.

No claim is made herein to the clamping mechanism since the same forms the subject matter of a separate application Serial No. 138,763 filed by me on the 30th day of September, 1926. The hoisting elements extend upwardly and around a pair of reeving elements or sheaves 26 from which they extend to the drums 7.

27 indicates a mounting for movably supporting the sheaves 26, so constructed that either or both thereof may bodily move upwardly (see Fig. 6) and thereby take up any slack occurring at any time in either or both hoisting elements 8 due to an obstruction getting below the lifting member and arresting its downward movement, or to any other reason. Of the mounting 27, 28 indicates a pair of spaced brackets (preferably angles) disposed on the inner side of the tie member 20 and supporting the opposite ends of a pin 29. 30 indicates a cradle pivoted at its outer end on the pin 29 and resting at its inner end on the cross-member 23 (see Figs. 1, 3 and 4). The cradle 30 comprises a pair of side members 31 connected in spaced relation near their outer ends by a U-member 32, a pair of angles 33 connected to their inner ends and an angle plate 34 connected to the angles 33, the horizontal portion of the angle 34 extending inwardly so as to overlie the cross-member 23 and engage therewith. As shown, the vertical portion of the angle 34 and U-member 32 are formed with aligned openings the axes of which are preferably disposed in a plane midway between the side members 31.

35 indicates a rock shaft rotatably mounted at its opposite ends in said openings and carrying intermediate its ends a block 36 having a depending portion 36ª formed with an opening 36ᵇ through it at right angles to the shaft 35. 37 indicates a rod or pin mounted in the opening 36ᵇ and extending laterally to either side of the depending portion 36ª, the opposite outer end portions of the pin 37 being reduced and forming shafts for the sheaves 26.

The rod 37 is held against rotation by a cotter pin 37ª and the sheaves are held on their shafts by similar devices 26ª.

38 indicates means interposed between the cross member 23 and cradle 30 normally tending to swing its inner end upwardly about the pivot 29. The means 38 in the form of construction herein illustrated comprise one or more springs 39 (two being shown)—preferably coiled springs—operatively engaging the flange 23ª of the member 23 and the horizontal portion of the angle 34 and arranged to be compressed or placed under tension when the cradle is moved into engagement with the cross member 23. Each spring surrounds a rod 40 which serves to support it in position and to guide its coils when expanding or being compressed. The upper end of each rod is provided with bifurcations arranged to straddle an eye-bolt 41 to which the bifurcations are pivotally connected, the eye-bolt being mounted in the angle 34; the lower portion of the rod extends through an opening 42 formed in the flange 23ª and slides therein when the cradle 30 swings upwardly. Each rod 40 is provided with a washer arranged to engage the inner portion of the bifurcations, the washer forming an abutment for the upper end of the adjacent spring 39 and the flange 23ª serving as an abutment for the lower end of the spring.

From the foregoing description it will be understood that the weight of the load lifting member transmitted through the cables 8 to the sheaves 26, which are carried by the cradle 30, will hold the inner end of the latter on cross member 23, whereby the cradle 30 will be supported at one end by the pin 29 and at the opposite end by the cross member 23. In the event slack occurs in the cables 8, which may result from the member 9 engaging an obstruction disposed in the path thereof downwardly, the weight or downward pressure on the cradle 30 will be relieved and permit the springs 39 to swing the cradle 30 upwardly and move the sheaves 26 to the position shown in Fig. 6. The movement of the sheaves upwardly will thus take up any slack present in the flexible elements 8. By operating the drums 7 to wind the cables thereon, the pull on the cables incident to lifting the member 9 will swing the cradle 30 downwardly into engagement with the cross member 23, which movement will again compress the springs 39 so that they will automatically operate the cradle when slack again occurs in the cables 8.

By mounting the sheaves 26 on a trunnioned support, the latter serves as an equalizing means, whereby any unequalness in the lengths of the cables 8 is compensated for automatically. This form of construction permits two cables to be utilized for supporting and operating the elevating member and eliminates the necessity of running the cables over a plurality of reeving elements and connecting their ends to an equalizing bar. By providing for the rocking of the sheaves 26 on the cradle 30, it will be seen that in the event slack occurs in one cable only, the cradle will swing upwardly and the sheaves 26 will rock on the axis of the shaft 35 to permit the sheave for the cable in which the slack has occurred to be moved upwardly by the cradle and take up such slack. Where slack has occurred in both cables but such slack is greater in one than in the other, this form of construction will permit the sheaves to compensate for such difference as the cradle swings upwardly to take up the slack.

Where one cable or flexible element is employed to raise and lower the load lifting member 9, the movable cradle will support and carry but one sheave 26, in which event it will not be necessary to trunnion it thereon.

43 indicates as an entirety a limit switch means operatively connected with the slack take up mechanism and arranged to automatically open the circuit to the motor 14 when such mechanism operates. By the provision of such mechanism, danger of undue slack occurring in the cables 8 is avoided as the motor 14 is stopped to prevent further paying out of the cables and the construction of the slack take-up mechanism may be materially simplified as its distance of movement is relatively short. Of the limit switch means 43, 44 indicates a casing preferably mounted on one of the brace members 21 by a bracket 21ᵃ and enclosing a switch mechanism having pairs of contacts 44ᵃ—44ᵇ and 44ᵃ—44ᵇ, through either of which the circuit is completed accordingly as the motor is driven in one direction or the other. The switch mechanism is preferably similar to the corresponding mechanism shown in my application Serial No. 610,791, filed January 5, 1923, on which Letters Patent No. 1,726,717 were granted September 3, 1929.

The circuit through either pair of contacts 44ᵃ—44ᵇ is broken by a device 44′ within the casing and connected to a rock shaft 45. The shaft 45 has connected to it a lever 46 and the outer end of the lever is operatively connected to a rod 47 which in turn is pivotally connected by an eye-bolt 47ᵃ to the angle 34 of the cradle 30, so that when the latter swings upwardly it swings the lever 46 to the position indicated by the line $x$ and opens the motor circuit. The operative connection 48 between the lever 46 and rod 47 will be later described.

The switch mechanism within the casing 44 also serves to open the motor circuit when the load lifting and carrying member moves to or approaches a predetermined position in either direction of movement, such mechanism being operated by the following instrumentalities: 49 indicates a lever fulcrumed on one of the brackets 22 (the bracket 22 adjacent the member 21 carrying the casing 44). One arm of the lever 49 is connected by a link 50 to the lever 46. The other arm of the lever 49 carries a rod 51 which extends downwardly parallel to the guides 19. At its upper and lower ends the rod 51 carries adjustable collars 52, either of which is engaged by a portion of the member 9 when it moves to or approaches its limit of movement, such portion preferably comprising a device 53 having a slot to receive the rod as the member moves upwardly and downwardly. As will be understood, the engagement of the device 53 with one of the collars 52 will move the rod 51 which in turn through the lever 49 and link 50 will operate the switch mechanism to open the circuit.

The connection 48 is of a construction to permit operation of the switch mechanism to open the circuit by movement of the lever 46 in either direction by the member 9 from its neutral position, which is shown in Fig. 4, without moving the rod 47, and at the same time insuring movement of the lever 46 to the position $x$ when the slack take-up mechanism 38 operates and movement of the lever back to neutral position when the cradle 30 moves into engagement with the cross member 23. Of the connection 48, 54 indicates a block having a stud shaft 54ᵃ rotatably fitting an opening formed in the free end of the lever 46. 55 indicates an opening formed in the block, the rod 47 extending through and being guided thereby. 56 indicate collars adjustably secured to the rod 47 at opposite sides of the block 54 and 57 indicates springs surrounding the rod 47 and each interposed between the block and one of the collars 56, the springs serving as yieldable connections between the block 54 and rod 47 and arranged to move the lever 46 when the rod 47 is operated. When the rod 50 moves the lever 46 to the position $x$ or position $x'$, the springs 57 permit the block 54 to slide on the rod 47 without moving it.

In the preferred form of construction shown herein, the sheaves 26, from which the flexible members 8 depend for connection with the load carrying or elevating member, are mounted for movement upwardly to take up the slack, as already set forth.

In such construction I am not only able to provide for slack take up where each flexible member runs around but one sheave between its winding and unwinding drum and the member or device to be operated but I eliminate the necessity of providing an extra sheave or sheaves to provide for the take up. Where the flexible member or members are reeved through a plurality of sheaves or pairs of sheaves for the purpose of increasing the lifting power, any one or any pair of such sheaves may be movably mounted in the manner set forth herein to effect the slack take-up.

To those skilled in the art to which my invention relates many changes in construction and widely differing embodiments and applications of the invention will suggest themselves without departing from the spirit and scope thereof. My disclosures and the description herein are purely illustrative and not intended to be in any sense limiting.

What I claim is:

1. In apparatus of the class described, the combination of a frame, a guide frame thereon, a member movably mounted on said guide frame, a pair of flexible elements operatively connected to said member for moving it along said guide frame, means for operating said elements, a pair of guiding devices for said elements, and a mounting for movably supporting said devices, said mounting comprising a support rotatably supporting said devices at its opposite ends and trunnioned on one of said frames on an axis disposed midway between said devices.

2. In apparatus of the class described, the combination of a frame, a guide frame thereon, a member movably mounted on said guide frame, a pair of flexible elements operatively connected to said member for moving it along said guide frame, a pair of guiding devices at the upper end of said guide frame and from which said elements depend for connection with said member, means for operating said elements, and a mounting at the upper end of said guide frame for movably supporting said devices, said mounting comprising a support rotatably supporting said devices at its opposite ends and trunnioned on said guide frame on an axis disposed midway between said devices.

3. In apparatus of the class described, the combination of a frame, a guide frame thereon, a load carrying member movable on said guide frame, a flexible element connected to said member for raising and lowering it, means for operating said element, a guiding device for said element, a mounting for movably supporting said device on one of said frames, and means automatically operating to move said mounting when slack occurs in said element to take up such slack.

4. In apparatus of the class described, the combination of a frame, a guide frame thereon, a load carrying member movable on said guide frame, a flexible element connected to said member for raising and lowering it, means for operating said element, a guiding device for said element, a mounting for movably supporting said device on one of said frames, and a spring normally tending to move said mounting in one direction whereby said device operates to take up slack in said element.

5. In apparatus of the class described, the combination of a frame, a guide frame thereon, a load carrying member movable on said guide frame, a flexible element connected to said member for raising and lowering it, means for operating said element, a guiding device for said element, a cradle in which said device is mounted, means for pivotally supporting one end of said cradle on one of said frames, a member against which the other end of said cradle is held by the pull or tension of said flexible element on said device, and means tending to swing said cradle about said pivotal supporting means and arranged to operate it when slack occurs in said element.

6. In apparatus of the class described, the combination of a frame, a guide frame thereon, a load carrying member movable on said guide frame, a flexible element connected to said member for raising and lowering it, means for operating said element, spaced inner and outer connecting members carried by the upper end of said guide frame, a cradle supported on said connecting members, said cradle being pivoted to one thereof and swingable upwardly relatively to the other, a guiding device for said element carried by said cradle, and means for swinging said cradle upwardly when slack occurs in said element.

7. In apparatus of the class described, the combination of a frame, a guide frame thereon, a load carrying member movable on said guide frame, a flexible element connected to said member for raising and lowering it, means for operating said element, spaced inner and outer connecting members carried by the upper end of said guide frame, a cradle supported on said connecting members, said cradle being pivoted to one thereof and swingable upwardly relatively to the other, a guiding device for said element carried by said cradle, and a spring normally tending to swing said cradle upwardly whereby said device operates to take up slack occurring in said element.

8. In apparatus of the class described, the combination of a frame, a guide frame thereon, a load carrying member movable on said guide frame, a pair of flexible elements connected to said member for raising and lowering it, means for operating said elements, guiding devices for said elements, a mounting for movably supporting said devices on one of said frames, and means automatically operating to move said mounting when slack occurs in said elements to take up slack therein.

9. In apparatus of the class described, the combination of a frame, a guide frame thereon, a load carrying member movable on said guide frame, a pair of flexible elements connected to said member for raising and lowering it, means for operating said elements, guiding devices for said elements, a mounting movably mounted on one of said frames, a support trunnioned on said mounting and rotatably supporting said devices at its opposite ends, and means automatically operating to move said mounting when slack occurs in either of said elements.

10. In apparatus of the class described, the combination of a frame, a guide frame thereon, a load carrying member movable on said guide frame, a pair of flexible elements connected to said member for raising and lowering it, means for operating said elements, guiding devices for said elements, a mounting for movably supporting said devices on one of said frames, and means automatically operating to move said mounting when slack occurs in said elements to take up slack therein, the last said means comprising a spring normally tending to move said mounting in one direction.

11. In apparatus of the class described, the combination of a frame, a guide frame thereon, a load carrying member movably mounted on said guide frame, a pair of flexible elements connected to said member for raising and lowering it, means for operating said elements, a pair of guiding devices around a portion of which said elements run, a mounting on one of said frames for said devices arranged to permit said devices to move relative to each other and to move relative to one of said frames, and means automatically operating to move said mounting relative to one of said frames when slack occurs in either of said elements.

12. In apparatus of the class described, the combination of a frame, a guide frame thereon, a load carrying member movably mounted on said guide frame, a pair of flexible elements connected to said member for raising and lowering it, means for operating said elements, a pair of guiding devices around a portion of which said elements run, a cradle in which said devices are supported, means for pivotally supporting one end of said cradle on one of said frames, a member against which the other end of the cradle is held by the pull or tension of said flexible elements on said devices, and means tending to swing said cradle about said pivotal supporting means when slack occurs in said elements.

13. In apparatus of the class described, the combination of a frame, a guide frame thereon, a load carrying member movably mounted on said guide frame, a pair of flexible elements connected to said member for raising and lowering it, means for operating said elements, a pair of guiding devices around a portion of which said elements run, a cradle pivotally supported at one end on one of said frames, a member against which the other end of said cradle is held by the pull or tension of said flexible elements on said devices, a support trunnioned on said cradle and carrying said devices, and means tending to swing said cradle about its pivotal support means when slack occurs in either of said elements.

14. In apparatus of the class described, the combination of a frame, a guide frame thereon, a load carrying member movable on said guide frame, a flexible element connected to said member for raising and lowering it, means for operating said element, a guiding device for said element, a mounting for movably supporting said device on one of said frames, means automatically operating to move said mounting when slack occurs in said element to take up such slack, and means operated by the movement of said mounting for cutting off power to said first mentioned operating means.

15. In apparatus of the class described, the combination of a frame, a guide frame thereon, a load carrying member movable on said guide frame, a flexible element connected to said member for raising and lowering it, means for operating said element, a guiding device for said element, a mounting for movably supporting said device on one of said frames, means automatically operating to move said mounting when slack occurs in said element to take up such slack, means for cutting off power to said first mentioned operating means, and separate operating means connected to said cutting off means arranged to be operated by said mounting and load carrying member, respectively.

16. In apparatus of the class described, the combination of a frame, a guide frame thereon, a load carrying member movable on said guide frame, a flexible element connected to said member for raising and lowering it, means for operating said element, a guiding device for said element, a mounting for movably supporting said device on one of said frames, means automatically operating to move said mounting when slack occurs in said element to take up such slack, means for cutting off power to said first mentioned operating means, and separate operating means connected to said cutting off means arranged to be operated by said mounting and load carrying member, respectively, the operating means for said mounting permitting the operation of the other operating means independently thereof.

17. In apparatus of the class described, the combination of a frame, a guide frame thereon, a load carrying member movable on said guide frame, a flexible element connected to said member for raising and lowering it, means for operating said element, a guiding device for said element, a mounting for movably supporting said device on one of said frames, means automatically operating to move said mounting when slack occurs in said element to take up such slack, means for cutting off power to said first mentioned operating means, and separate operating means connected to said cutting off means arranged to be operated by said mounting and loading carrying member, respectively, one of said last mentioned operating means including yieldably connected devices to permit operation of the other last mentioned operating means.

In testimony whereof, I have hereunto subscribed my name.

EDWARD H. REMDE.